United States Patent [19]

Schieck

[11] 4,191,467

[45] Mar. 4, 1980

[54] DUAL MODE CATCH TRAY

[75] Inventor: Richard A. Schieck, Rochester, N.Y.

[73] Assignee: Xerox Corporation, Stamford, Conn.

[21] Appl. No.: 27,183

[22] Filed: Apr. 4, 1979

[51] Int. Cl.[2] .................................... G03B 27/62

[52] U.S. Cl. .................................... 355/75; 312/60; 355/3 SH; 355/72; 355/133

[58] Field of Search .............. 312/60; 355/3 SH, 3 R, 355/72, 75, 133

[56] References Cited

U.S. PATENT DOCUMENTS

| | | | |
|---|---|---|---|
| 3,076,392 | 2/1963 | Cerasani et al. | 355/3 R |
| 3,154,356 | 10/1964 | Lewis et al. | 312/60 |
| 3,804,514 | 4/1974 | Jasinski | 355/75 |
| 3,860,339 | 1/1975 | Bendall | 355/3 SH |
| 3,912,389 | 10/1975 | Miyamoto | 355/133 |
| 3,973,846 | 8/1976 | Sullivan et al. | 355/3 R |
| 4,086,007 | 4/1978 | Smith et al. | 355/3 R |
| 4,097,147 | 6/1978 | Portewig | 355/75 X |
| 4,155,643 | 5/1979 | Ladds et al. | 355/72 |

*Primary Examiner*—Richard A. Wintercorn

[57] ABSTRACT

A dual purpose document and copy sheet receptacle for reproducing apparatus pivotally mounted at the copy output end of the apparatus and capable of acting as a copy catch tray in a first position or mode of operation and when pivotted to second position as a document catch tray in a second mode of operation. The dual purpose tray provides the reproducing apparatus in a first mode of operation with the ability to copy extra long documents such as fan fold sheets or rolled copy paper onto fan fold paper or rolled copy paper and neatly stacks the fan fold or collects the rolled paper at the output end of the apparatus and in the second mode of operation with the ability to copy extra long single document and catch them in a large catch tray.

11 Claims, 4 Drawing Figures

DUAL MODE CATCH TRAY

BACKGROUND OF INVENTION

This invention relates to copy sheet and original document catch trays. This apparatus is particularly adapted for use with automatic reproduction machines.

In the reproduction art it has frequently been found advantageous to be able to produce copies of original sized documents larger than normal 8½×11 inch or legal 8½×14 inch size. It has also been advantageous to produce copies of originals which are of an extra long character. For example, strip chart recorders often generate documents many feet in length.

It is known that with a Xerox 3100 LDC copier it is possible to handle regular, legal size and oversized, up to 14×18 inches, documents and copy paper and produce faithful reproductions. It is also known to produce copies of extra long documents many feet in length in web or fan fold configuration.

When using such an apparatus to reproduce extra long length documents on fan fold copy substrates the copy sheets of the continuous fan fold will most satisfactorily stack upon themselves when exiting the apparatus if they are permitted to fall vertically straight down as close to the side of the apparatus as possible. This enables the operator to automatically maintain control on at least one folding direction and thereby ensure that the fan folded copies are accurately stacked. In this configuration it is also desirable to have adequate document take up capacity for the extra long run documents being fed through the document feeder and copied.

To enable this type of configuration, the copy output area of some reproducing apparatus such as the 3100 LDC must be modified by reducing the size of the copy output tray. This is desirable to ensure that the fan folded copy falls straight down the side of the machine to the fan fold stacking tray. With the size of the copy output tray reduced, the ability to receive and retain extra large single copies is reduced since such copies fall out of the reduced size output tray onto the floor.

When reproducing extra long length documents in a reproducing apparatus it is also desirable to arrange some manner of collecting and stacking the portion of the document which has already been copied.

PRIOR ART STATEMENT

Reproducing apparatus has conventionally employed copy catch trays. In addition, U.S. Pat. No. 3,154,356 to Lewis et al discloses a paper catch tray for receiving both documents and copies. Reproducing apparatus also known in the art and capable of handling both web type originals or documents in web type copy sheets is described in U.S. Pat. No. 3,076,392 to Cerasani et al. In addition apparatus for forming images on a web type copy sheet in fan fold form are described in U.S. Pat. No. 3,973,846 to Sullivan et al. Further imaging fan fold type original documents is exemplified by U.S. Pat. No. 3,804,514.

Various copying machines are available on the market which are capable of copying long originals on equally long copy sheets. In the catch tray at the output station of Xerox 3107 copier, the output tray has a top portion for receiving documents and a large copy tray at the output end of the copier for receiving copies up to 14×18 inches in size. In addition, U.S. Pat. No. 4,086,007 to Smith et al describes apparatus employing extra long documents either rolled or in fan folded form and wherein the copy sheet may be in fan folded form.

SUMMARY OF THE INVENTION

In accordance with this invention a dual purpose document and copy sheet receptacle for receiving copies and/or documents from a reproducing apparatus is provided. This receptacle provides storage and catch means for either documents which are being reproduced or copies which have been made.

More particularly, the present invention is directed to a dual purpose document and copy sheet receptacle which when used in a first position or mode of operation is a receptacle for receiving copies and which when used in a second position or mode of operation is a receptacle for receiving copied originals. The receptacle is pivotally mounted between said first and second positions to provide said first and second modes of operation.

The present invention also provides a multimode reproducing apparatus wherein said dual purpose tray interacts with the several modes of operation of the machine acting as either a document catch tray or a copy catch tray. In particular, the multimode reproducing apparatus may function to produce regular, legal or oversize copies up to about 14×18 inches in dimension when the receptacle is employed as a copy sheet catch tray at the reproducing apparatus copy eject or output station. Alternatively the dual purpose tray may be pivoted to its second position of operation and function as a copied document receiving tray. In this orientation extra long documents fed across the document platen particularly by the document feeder are collected in the catch tray. At the same time the extra long copies produced on fan fold copy paper are able to fall vertically from the copy output station and neatly stack themselves on top of one another.

Accordingly, it is an object of the present invention to provide a dual purpose document and copy sheet receptacle and a reproducing apparatus employing same.

It is an additional object of the invention to provide in a single reproducing machine the ability to reproduce and neatly collect normal, legal and oversize copies as well as continuous roll or fan folded copy output.

It is a further object of the invention to provide a document catch tray at the end of the platen particularly for the purpose of neatly stacking roll or fan fold original documents after they have been fed across the viewing platen or through the document handler.

For a better understanding of the invention, as well as other objects and further features thereof, reference is had to the following drawings and description.

DESCRIPTION OF PREFERRED EMBODIMENT

The invention will now be described by reference to a preferred embodiment of a dual purpose document and copy sheet receptacle.

Figure 1:
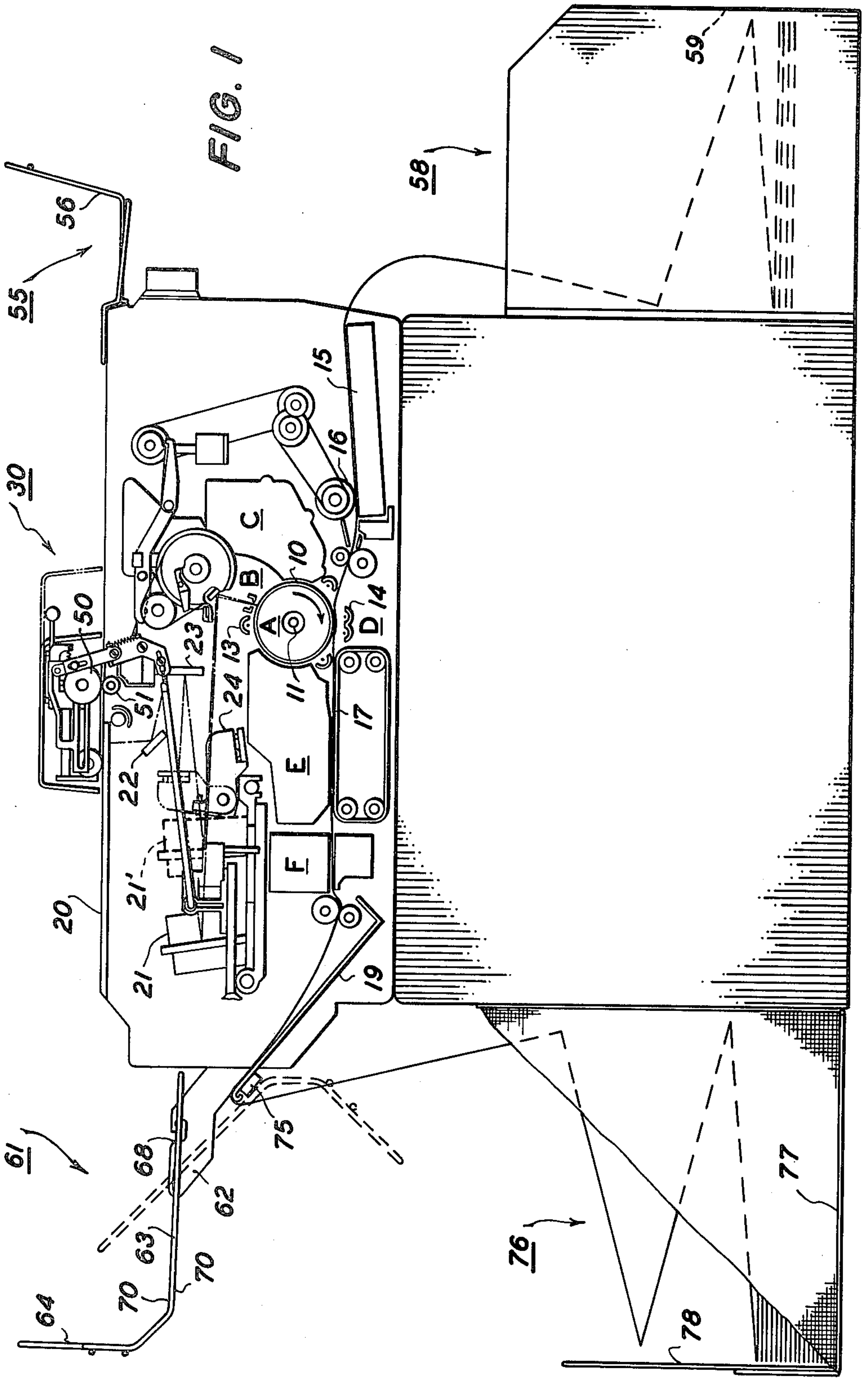
FIG. 1 is a schematic representation of an automatic xerographic reproducing apparatus employing the dual purpose document and copy sheet receptacle of the present invention.

Referring to FIG. 1, there is illustrated a schematic representation of a compact automatic xerographic copying machine incorporating the dual purpose document and copy sheet receptacle of the present invention. The copier depicted in FIG. 1 illustrates the various components utilized for xerographically reproducing copies from an original document. A machine of this general type is exemplified by U.S. Pat. No. 3,877,804 to Hoppner.

Basically, the xerographic processor includes a rotatably mounted photosensitive or photoconductive drum 10 which is supported upon a horizontally extended shaft 11. The drum is driven in the direction indicated whereby the photoconductive surface is caused to pass sequentially through a series of xerographic processing stations.

Basically the xerographic process is widely known and used in the art, the various processing steps involved will be briefly explained below with reference to FIG. 1. Initially, the photoconductive drum surface is uniformly charged by means of a corona generator 13 positioned within a charging station A located at approximately the 12 o'clock drum position. The charged drum surface is then advanced into an imaging station B wherein a flowing light image of an original document to be reproduced is projected onto the charged drum surface thus recording on the drum a electrostatic latent image containing the original input scene information. Next, subsequent to the exposure step in the direction of drum rotation is a developing station C wherein the electrostatic latent image is rendered visible by applying an electroscopic marking powder (toner) to the photoreceptor surface in a manner well known and used in the art. The now visible image is then forwarded into a transfer station D wherein a sheet of final support material is brought into overlying moving contact with the toner image and the image transferred from the plate to the support sheet by means of a second corona generator 14.

In normal operation, a supply of cut sheets are supported within the machine by means of a removable paper cassette at paper supply 15. In operation for copying extra long documents a copy roll or fan fold paper supply is provided as will be more fully described later. A pair of feed rollers 16 are arranged to operatively engage the uppermost sheet in the cassette so as to first separate the top sheet from the remainder of the stack and then advance the sheet into the transfer station in synchronous moving relationship to the developed image on the photoconductive plate surface. The motion of the feed rollers is coordinated with that of the rotating drum surface, as well as the other machine components through the main drive system whereby the support sheet is introduced into the transfer station in proper registration with the developed toner image supported on the xerographic plate.

After transfer, but prior to the reintroduction of the imaged portion of the drum into the charging station, the drum surface is passed through a cleaning station E wherein the residual toner remaining on the drum surface is removed. The removed toner particles are collected within a container where they are stored subject to periodic removal from the machine.

Upon completion of the image transfer operation, the toner bearing support sheet is stripped from the drum surface and placed upon a moving vacuum transport 17 which serves to advance the support sheet into a thermal fusing station F wherein the toner image is permanently fixed to the sheet. The copy sheet with the fused image thereon is forwarded from the fuser into a collecting tray 19 where the sheet is held until such time as the operator has occasion to remove it from the machine.

Normally, when the copier is operated in a conventional mode, the original document to be reproduced is placed image side down upon a horizontal transparent viewing platen 20 and the stationary original then scanned by means of a moving optical system. The scanning system fundamentally consists of a stationary lens system 21 positioned below the right hand margin of the platen as viewed in FIG. 1 and a pair of cooperating movable scanning mirrors 22, 23 which are carried upon carriages not illustrated. For further description and greater details concerning this type of optical scanning system reference is had to U.S. Pat. No. 3,832,057 to Shogren.

The illustrated compact copying apparatus is also provided with a large document copying capability, that is, with the ability to reproduce originals of a size greater than the physical dimensions of the viewing platen. To achieve this end, a document feeder 30 is provided that is movable between a first stored position adjacent to the viewing platen and a second operative or large document handling position over the platen surface. Commensurate with the positioning of the feeder assembly over the platen, the moving optical system is locked in a position to view documents as they are advanced through the document feeder and record a flowing light image of the input information upon the moving photoconductive plate surface. Similarly, the various machine components are conditioned to accept the protracted input so that documents that would ordinarily lie outside the normal viewing domain of the scanning optics can be processed and full sized copies thereof produced.

In another mode of operation the image of the original may be reduced in size by the optical system for projection onto the photoconductor whereby the image which is transferred to the sheet of final support material is similiarly reduced in size. In this reduction mode an alternative lens 21' and an add mirror 24 are inserted from stored positions to operative position as shown by the dotted lines in FIG. 1 to change the conjugate distance between the lens and the object or image plane. It is also necessary to advance the document past the fixed optical system at a speed greater than the peripheral speed of the drum 10. Further details with respect to this aspect of the optical system may be had by reference to U.S. Pat. No. 4,029,409 to Spinelli et al.

During normal operations, that is, when the moving optics are utilized to provide a flowing light image of the stationary original, the document feeding assembly is maintained in a stored position (as depicted by the phantom lines shown in FIG. 1) to expose the entire platen surface area and thus provide a maximum working area to the operator. To initiate the large document mode of operation, the machine operator simply advances the document feeding assembly from the stored position to a document feeding position with the feeding assembly extending over the left hand margin of the platen surface.

Once the document feeder is advanced to the operative position and the optical system in a viewing position therebeneath a signal is generated indicating that the machine is now in a condition to reproduce copy from a large document input. During production of a copy the original is fed by the document feeder between cooperating feed rollers and pinch rollers, 50 and 51 respectively, which engage the document in friction driving contact and advance the document along the platen surface past the fixed optical system. As the leading edge of the original document is being advanced over the platen, a sensing switch is actuated sending a signal to the machine logic which, in turn, conditions the machine to produce a single copy from the original. The cooperating feed rollers are adapted to advance the original over the platen at a rate equal to the peripheral speed of the xerographic drum whereby the original input scene information is recorded on the drum in the manner herein described. The advancement of the sheet continues until such time as the trailing edge of the document clears the above noted switch thus telling the logic system that the document recording operation is completed. For further description and greater details concerning this type of document feeding apparatus reference is had to U.S. Pat. No. 3,900,258 filed in the name of Hoppner et al.

For copying extra long documents such as roll or fan fold type documents a roll or web type document supply 55 is provided. This may take the form of a wire form document tray 56 for fan fold documents or alternatively a spool and corresponding support if the document supply is in roll form. Correspondingly the copy paper may be supported on a paper supply 58 which may also take the form of wire platform 59 or alternatively a paper spool and corresponding support if the document supply is in roll form.

Figure 2:
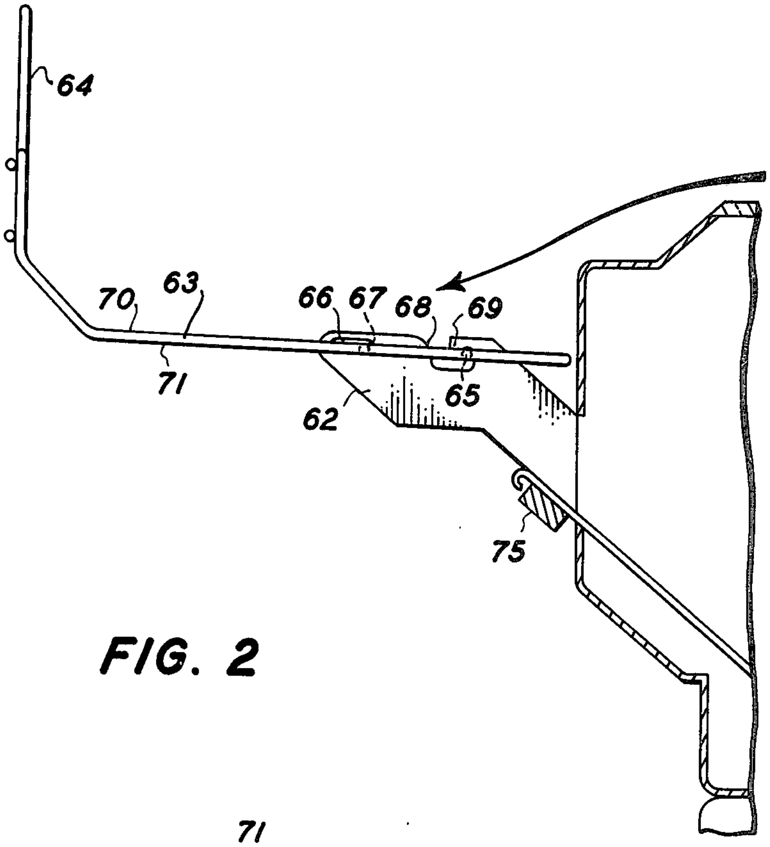
FIG. 2 is a partial side view with the pivotal tray in the document catch position.
Figure 3:
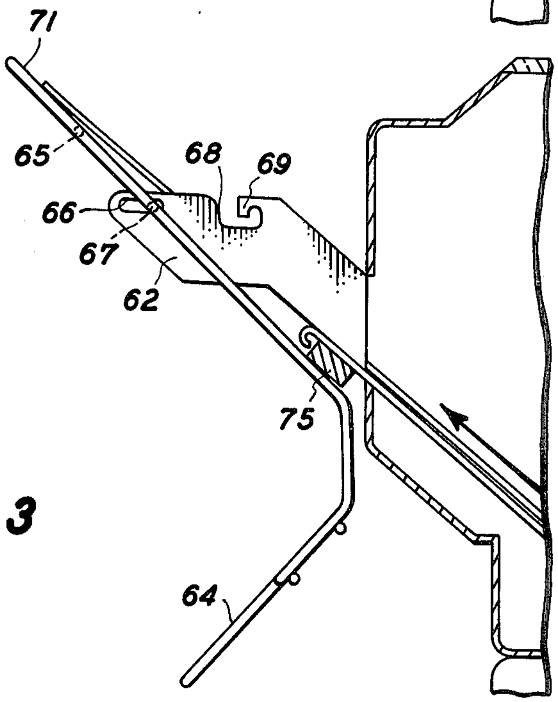
FIG. 3 is a partial side view with the pivotal tray in the large copy catch position.
Figure 4:
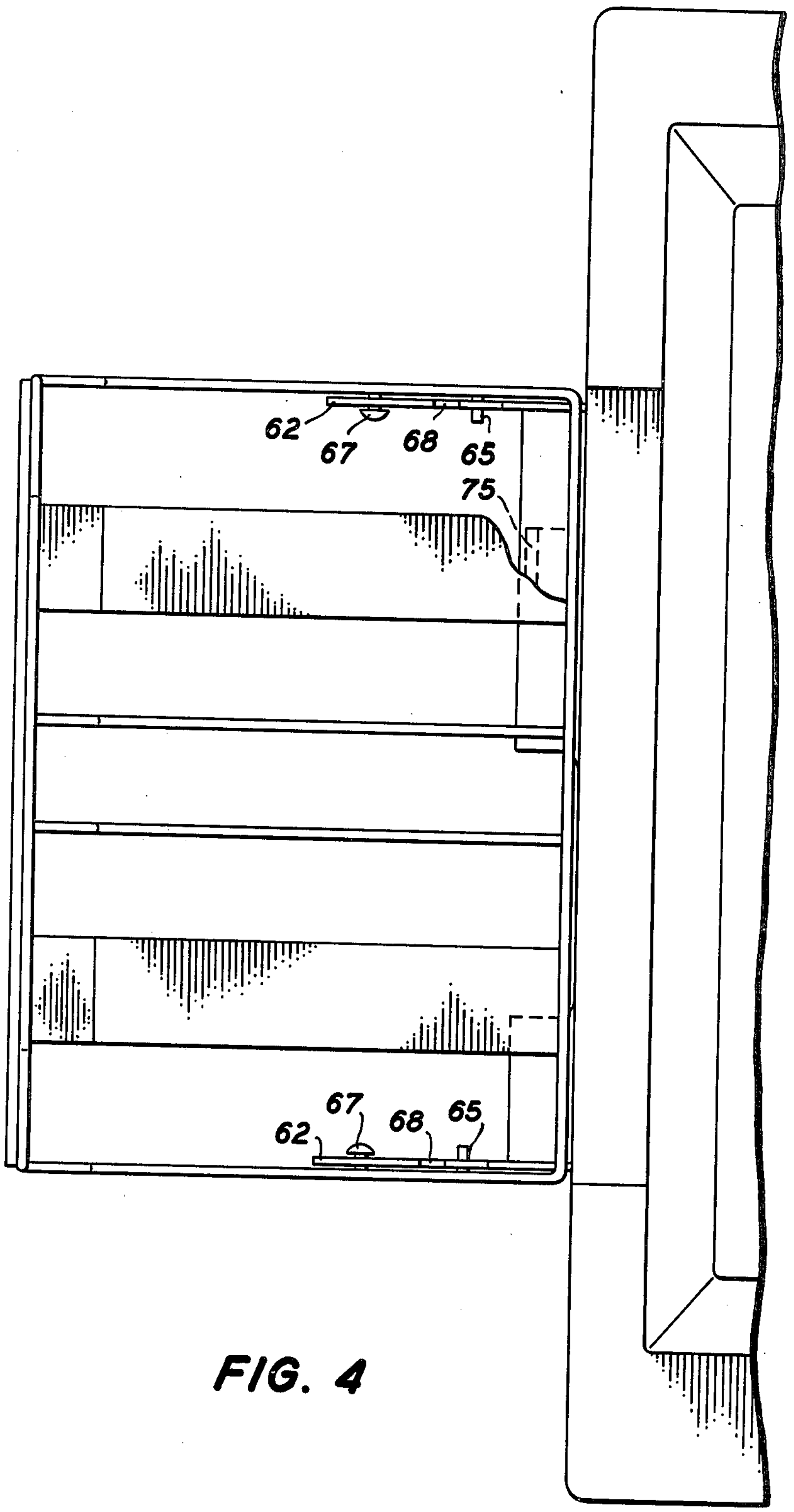
FIG. 4 is a top view of FIG. 2 with the pivotal tray in the document catch position.

At the output end of the machine is the dual purpose document and copy sheet receptacle 61 of the present invention. Two support brackets 62 mounted to both sides of the reproducing apparatus near its copy output area support the dual purpose receptacle, illustrated as a tray 63 having a vertical stop wall 64, top support surface 70 and bottom support surface 71. The tray is held fixed in the document receiving position by the slot and pin arrangement shown in FIGS. 2 and 3 wherein the two pivot pins 67 fixed to tray 63 are permitted to move laterally within elongated slot 66 in the tray support brackets. To lock the tray in the document receiving position the tray is pulled laterally to the left in the position shown in FIG. 1 so that pin 65 on tray 63 may be inserted in slot opening 68 whereupon the tray is urged laterally to the right with the pin 65 passing around pin detent member 69 to hold the tray in the document feeding position.

To move the tray to the copy catch tray position, the tray is pulled down and out to the left as the pin 65 is moved in slot opening 68 around detent member 69 through slot opening 68. The tray is then pivoted counterclockwise on pivot pin 67 to the copy receiving position and fixedly held in that position by a suitable fastener or latching mechanism. When using a metal or wire form tray it is particularly convenient to use a magnet 75 fastened to the output tray section of the reproducing apparatus to hold the tray in the copy receiving position.

The extra long copy sheets or fan folded copies are stacked in stacking tray 76 pivotally mounted to the base of the reproducing apparatus and permitting fan folded copy sheets to fall vertically along the side of the reproducing apparatus into the stacking tray 76. The stacking tray 76 includes base 77 and copy stop member 78 to assist in the orderly stacking of fan folded copies. When the large copy stacking tray is not in use, stop member 78 may be folded down into base 77 and the whole tray 76 then pivoted clockwise and securely fastened to the side of the reproducing apparatus thereby placing the tray in the stored position.

This reproducing apparatus is capable of operating in a plurality of modes of operation. When the dual purpose receptacle is in position for receiving copies produced by the reproducing apparatus, these copies may be produced by placing a regular or legal size document on the viewing platen 20 and scanning the document in the conventional manner as described above. Individual copies so produced are collected in the output tray. Alternatively the document feeder may be placed in position and the optical assembly locked into position near the edge of the viewing platen. In this configuration the document is fed across the platen by the document feeder with copies being collected in the output tray. In this mode of operation documents may if desired, be stream fed, serially one after the other, and their copies collected in the output tray. With the document feeder in position the reproducing apparatus is now capable of reproducing large size documents up to 14×18 inches in dimension and collecting the copies produced in the output tray. With the dual purpose catch tray of this invention these oversize copies may be neatly collected in the tray rather than having one or more be ejected from the reproducing apparatus only to fall to the floor.

When the dual purpose receptacle is in position for receiving copied originals reproduced by the reproducing apparatus when used in the second mode of operation extra long documents may be copied. In this mode of operation since the dual purpose receptacle 61 is pivoted to the copied original receiving position the extra long copies are permited to fall vertically from the output area down the side of the reproducing apparatus between the support brackets 62. The copied originals are collected in tray 63 which is positioned at a horizontal level below the end of the platen so as not to inhibit transport of the copied originals into the tray. Vertical stop member 64 assists in stacking copied originals, particularly extra long or fan fold originals by providing a surface to stop forward motion and permit rolling up or the paper to fall back on itself.

In this mode of operation copying may be initiated by inserting a document 40 into the document feeder 30. A sensing switch (not shown) in the document feeder 30 acts as a start print button and upon sensing the lead edge of the document, the switch causes the copying sequence including feeding of the extra long or fan folded copy paper to be programmed in the conventional manner. The feeding of the copy sheet and the document continue until the document exits the document feeder after which the machine proceeds to shut down in a conventionally timed sequence. Upon shut down the feeding of the copy sheet ceases. By choosing a copy sheet which is the same length as the document the entire copy sheet will exit from the copier before the machine shuts down.

The patents specifically referred to in this application are intended to be incorporated by reference into the description.

In accordance with this invention a dual purpose document and copy sheet receptacle has been provided which has the objects and advantages herein set forth. In particular, it provides the capability in one reproducing machine of being able to copy and collect regular, legal or extra large and extra long run documents. The dual purpose receptacle uniquely accomplishes copy sheet receiving or copied document receiving operations by pivoting a tray member such that one side provides a support surface for copied documents and the other side of the tray member provides a support surface for copy sheets. While the invention has been described with reference to the specific embodiments described, it will be apparent to those skilled in the art that many alternatives, modifications or variations may be made. For example, while the dual purpose receptacle has been described as being a wire form, sheet metal or plastic configurations not departing from the spirit of the invention could be employed. Accordingly, it is intended to embrace all such alternatives, modifications as may fall with the spirit and scope of the appended claims.

What is claimed is:

1. A dual purpose document and copy sheet receptacle for receiving copies produced from a reproducing apparatus when said receptacle is used in a first mode of operation and for receiving copied originals when said receptacle is used in a second mode of operation, said receptacle comprising a first support surface for receiving copies produced when said receptacle is used in said first mode of operation and a second support surface for receiving copied originals when said receptacle is used in said second mode of operation, said receptacle being pivotally mounted to provide first and second support surfaces when used in said first and second modes of operation respectively.

2. The receptacle of claim 1 wherein in said second mode of operation said receptacle is pivotally positioned to provide a generally horizontal receiving surface and wherein said receiving surface abuts with a vertical stop surface.

3. The receptacle of claim 1 wherein in said first mode of operation said receptacle is pivotally positioned to provide a generally vertically inclined stacking tray.

4. The receptacle of claim 1 including side support arms to pivotally attach said receptacle to said reproducing apparatus and further comprising means to secure said receptacle in each of said first and second positions.

5. The receptacle of claim 1 wherein said first and second support surfaces comprise the opposite sides of a tray member.

6. Multimode reproducing apparatus including means for exposing an imaging surface to the document to be reproduced, means to feed said document to said exposure means, means for forming an image of the document on a copy sheet, output means to eject said copy sheet from said apparatus and means to catch said document after exposure to said exposure means, said output means and document catch means being at the output end of the reproducing apparatus, the improvement comprising a dual purpose document and copy sheet receptacle pivotally mounted at the output end of the reproducing apparatus, said receptacle comprising a first support surface for receiving copies produced when said receptacle is used in a first mode of operation and a second support surface for receiving copied originals when said receptacle is used in a second mode of operation, said receptacle being pivotally mounted between first and second positions for use in said first and second modes of operation respectively.

7. The apparatus of claim 6, wherein said pivotally mounted receptacle is positioned next to said copy sheet output means for receiving copies reproduced in the said first mode of operation or is positioned generally horizontally near the output side of the document feed means to receive copied originals when used in said second mode of operation.

8. The apparatus of claim 6, wherein in said second mode of operation said receptacle is pivotally positioned to provide essentially a horizontal receiving surface and wherein said receiving surface abuts with a vertical stop surface.

9. The apparatus of claim 6 wherein in said first mode of operation said receptacle is pivotally positioned to provide a generally vertically inclined copy sheet stacking tray.

10. The apparatus of claim 6 including side support arms to pivotally attach said receptacle to output end of said reproducing apparatus and further comprising means to secure said receptacle in each of said first and second positions.

11. The apparatus of claim 6, wherein said first and second support surfaces comprise the opposite sides of a tray member.

* * * * *